(12) United States Patent
Sun

(10) Patent No.: US 10,859,792 B2
(45) Date of Patent: Dec. 8, 2020

(54) LENS DRIVING DEVICE, CAMERA DEVICE AND ELECTRONIC APPARATUS

(71) Applicant: New Shicoh Motor Co., Ltd., Zhejiang (CN)

(72) Inventor: Wei Sun, Zhejiang (CN)

(73) Assignee: New Shicoh Motor Co., Ltd., Zhejiang (CN)

(*) Notice: Subject to any disclaimer, the term of this patent is extended or adjusted under 35 U.S.C. 154(b) by 128 days.

(21) Appl. No.: 16/247,580

(22) Filed: Jan. 15, 2019

(65) Prior Publication Data

US 2019/0227260 A1    Jul. 25, 2019

(30) Foreign Application Priority Data

Jan. 19, 2018  (CN) .......................... 2018 1 0053692

(51) Int. Cl.
*G02B 7/10* (2006.01)
*G02B 13/00* (2006.01)
*G02B 7/02* (2006.01)

(52) U.S. Cl.
CPC .............. *G02B 7/10* (2013.01); *G02B 7/023* (2013.01); *G02B 13/001* (2013.01)

(58) Field of Classification Search
CPC ......... G02B 7/10; G02B 7/023; G02B 13/001
See application file for complete search history.

(56) References Cited

U.S. PATENT DOCUMENTS

2008/0253003 A1    10/2008  Shin et al.
2017/0261720 A1*   9/2017   Kang ...................... G02B 7/09

FOREIGN PATENT DOCUMENTS

KR       10-0849580 B      7/2008
KR   10-2011-0025512 A     3/2011

* cited by examiner

*Primary Examiner* — Minh Q Phan
(74) *Attorney, Agent, or Firm* — Yokoi & Co., U.S.A.; Toshiyuki Yokoi

(57) ABSTRACT

Provided are a lens driving device capable of miniaturizing the entire configuration, and a camera device and an electronic apparatus provided with the lens driving device. The lens driving device of the present disclosure includes: a lens support; a main body for supporting the lens support; a guide mechanism for guiding forward and backward movement of the lens support along an optical axial direction of the lens; and a driving mechanism for generating a driving force for driving the forward and backward movement of the lens support along the optical axial direction. The main body, the guide mechanism, and the driving mechanism are all provided only on one side in a first direction orthogonal to the optical axis direction of the lens with respect to the center of the lens.

9 Claims, 7 Drawing Sheets

LENS DRIVING DEVICE, CAMERA DEVICE AND ELECTRONIC APPARATUS

CROSS-REFERENCES TO RELATED APPLICATIONS

This patent specification is based on Chinese patent application, No. 2018-10053692.4 filed on Jan. 19, 2018 in the China Patent Office, the entire contents of which are incorporated by reference herein.

BACKGROUND OF THE INVENTION

1. Field of the Invention

The present disclosure relates to a lens driving device used in a camera device provided in an electronic apparatus such as a portable phone, a smart phone or the like, a camera device provided with the lens driving device, and an electronic apparatus provided with the camera device.

2. Description of Related Art

As a conventional lens driving device, there is known a structure in which a lens support is driven by a driving mechanism using a driving magnet and driving coil (lens assembly), and the movement of the lens support is guided by a guide mechanism using a ball and a guide groove (for example, Patent Document 1, 2). Such a lens driving device is configured such that a driving mechanism is provided on one side of the lens assembly to make the lens assembly move forward and backward.

Patent Document 1: Korean Publication No. KR0849580B

Patent Document 2: Korean Publication No. KR2011-0025512

However, in the lens driving device as described above, since the lens assembly, the driving mechanism and the guide mechanism are accommodated in the predetermined housing, it is difficult to miniaturize the device as a whole. In addition, for example, in the lens driving device of Patent Document 1, the portion other than the portion where the driving mechanism is provided to the lens assembly is surrounded by the guide mechanism, and in the lens driving device of Patent Document 2, the portion other than the portion where the driving mechanism is provided to the lens assembly is surrounded by a frame having a cylindrical cylinder shape. Therefore, it is difficult for such a lens driving device to realize a small lens driving device having functions such as focus adjustment and optical zooming in combination with other lens driving devices.

BRIEF SUMMARY OF THE INVENTION

In view of the above problems, an object of the present disclosure is to provide a lens driving device that is easy to miniaturize when combined with other lens driving devices, a composite lens driving device that is combined with other lens driving devices, a camera device and an electronic apparatus equipped with the lens driving device or the composite lens driving device.

In order to realize the above object, the lens driving device of the present disclosure includes: a lens support; a main body for supporting the lens support; a guide mechanism for guiding forward and backward movement of the lens support along an optical axial direction of the lens; and a driving mechanism for generating a driving force for driving the forward and backward movement of the lens support along the optical axial direction. The main body, the guide mechanism, and the driving mechanism are all provided only on one side in a first direction orthogonal to the optical axis direction of the lens with respect to the center of the lens.

According to such a configuration, the main body, the guide mechanism, and the driving mechanism of the lens support are all provided on only one side of the lens support, and no other member is provided on the opposite side of the lens support. Particularly, since it is possible to achieve predetermined functions even without accommodating these members in a predetermined housing, miniaturization of the entire lens driving device can be easily realized.

Further, since the lens driving device as described above has a portion where no other member is provided on the outer peripheral surface of the lens support, it is easy to miniaturize when used in combination with other lens driving devices.

Preferably, the lens support includes: a lens holding portion for holding the lens; a first extension portion formed by extending from the lens holding portion to one side in the first direction; and a second extension portion formed by extending from a front end of the first extension portion toward both sides in a second direction orthogonal to the optical axial and the first direction.

The main body includes: a first external wall formed by extending along the second direction; opposing second external walls formed by extending from both ends of the first external wall along the first direction; and third external walls formed by extending toward each other along the second direction from the ends of the opposing second external walls opposite to the ends where the opposing second external walls are connected to the first external wall.

The lens support is combined with the main body such that the second extension portion is provided between the first external wall and the third external walls, and the front ends of the third external walls face the first extension portion.

According to such a configuration, even when an external force that causes the lens support to fall off from the main body is applied, since the second extension portion is surrounded by the first external wall to the third external walls, the lens support will not be separated from the main body, and the form of the lens driving device can be maintained. Further, since the third external walls face the first extension portion, it can be ensured that the main body is provided only on one side in the first direction with respect to the center of the lens.

Preferably, the first extension portion and the second extension portion of the lens support are separated from the first external wall to the third external walls of the main body by a predetermined distance.

According to such a configuration, since the first extension portion and the second extension portion are separated from the first external wall to the third external walls by a predetermined distance, the lens support does not directly contact with the main body and excessive friction does not occur.

Preferably, the first extension portion further includes a third extension portion extending in the optical axial direction at the front end thereof, and the second extension portion extends from the third extension portion.

According to such a configuration, it is possible to freely set the position of the lens holding portion in the optical axial direction. Thus, the degree of freedom in designing when combining with other lens driving devices is increased.

Preferably, the guide mechanism comprises: a first guide portion provided on an inner side of the first external wall which faces the third external wall; a second guide portion provided on a rear side surface after combining the first extension portion and the second extension portion corresponding to the first guide portion; and a rolling member provided between the first guide portion and the second guide portion.

According to such a configuration, it is possible to more smoothly conduct the forward and backward movement of the lens support along the optical axis direction of the lens by receiving the guide of the guide mechanism.

Preferably, the driving mechanism includes: a magnet provided on the rear side surface after combining the first extension portion and the second extension portion of the lens support; and a coil provided on the first external wall of the main body.

According to such a configuration, it is possible to generate a driving force which makes the lens support move forward and backward by the interaction between the magnet and the coil.

Further, in order to achieve the above object, the present disclosure may be a composite lens driving device including: a lens driving device having the configuration as described above; and another lens driving device, wherein the optical axes of the two lens driving devices coincide with each other, and the main body is provided on the lateral side of the lens of the other lens driving device.

According to such a configuration, it is possible to configure the composite lens driving device without deviating considerably from the size of other lens driving device and easily miniaturize the composite lens driving device.

Preferably, the other lens driving device is a lens driving device having the above configuration, and the two main bodies are opposed to each other with the lens interposed therebetween.

According to such a configuration, since it is possible to reduce the size in the alignment direction of the two main bodies, the composite lens driving device can be easily miniaturized.

Further, in order to achieve the above object, the present disclosure provides a camera device and an electronic apparatus including a lens driving device having the above-described configuration.

According to the present disclosure, the lens driving device can be miniaturized and is easily miniaturized when combined with other lens driving devices. Therefore, it is possible to realize the miniaturization of the entire configuration of the camera device and the electronic apparatus equipped with the lens driving device or the composite lens driving device of the present disclosure.

Figure 1:
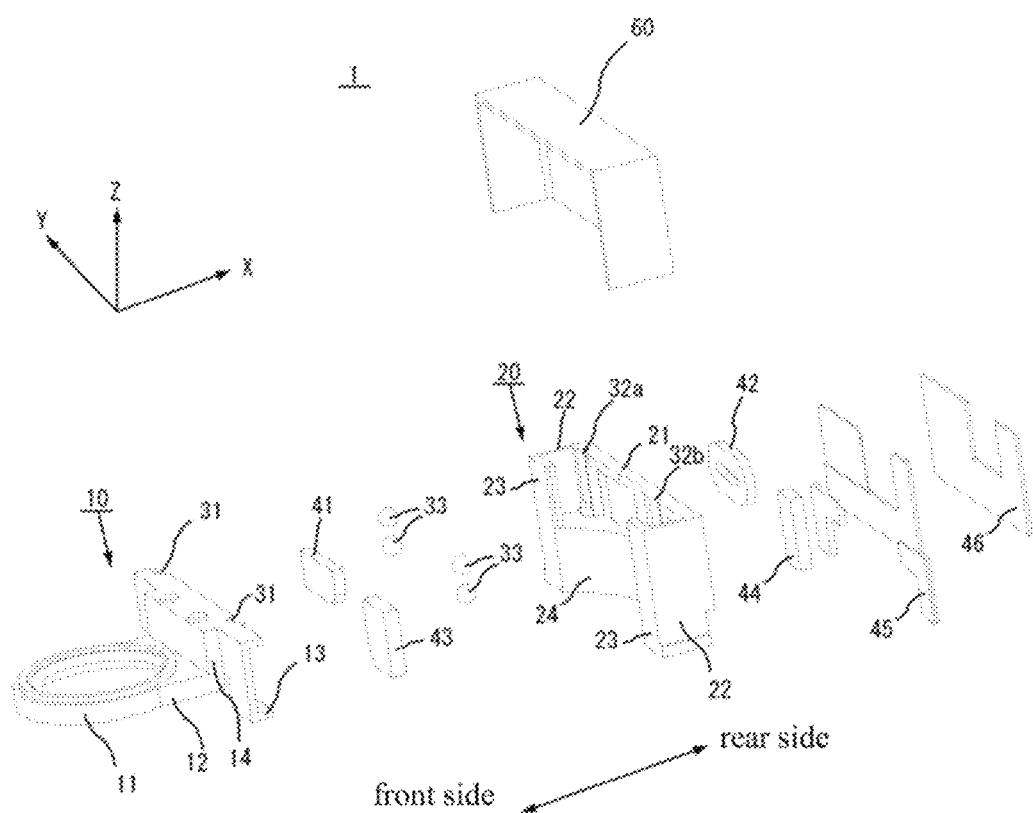
FIG. 1 is an exploded perspective view showing the configuration of a lens driving device according to an embodiment of the present disclosure as observed from the front side.

The description of the reference numerals is as follows:
1, 1a, 1b lens driving device;
10, 10a, 10b lens support;
11 lens holding portion;
12 first extension portion;
13 second extension portion;
14 third extension portion;
20 main body;
21 first external wall;
22 second external wall;
23 third external wall;
24 base portion;
31 guide groove;
32a first accommodation groove;
32b second accommodation groove;
321 first bottom surface;
322 second bottom surface;
33 ball;
34 partition plate;
41 magnet;
42 coil;
43 position-detecting magnet;
44 position-detecting element;
45 circuit board;
46 yoke;
47 magnet disposition portion;
48 position-detecting magnet disposition portion;
49 coil arrangement window;
50 position-detecting element arrangement window;
60 cover;
70, 71 composite lens driving device.

DETAILED DESCRIPTION OF THE INVENTION

Hereinafter, in order to understand the present disclosure, the embodiments of the present disclosure will be described with reference to the drawings.

Figure 2:
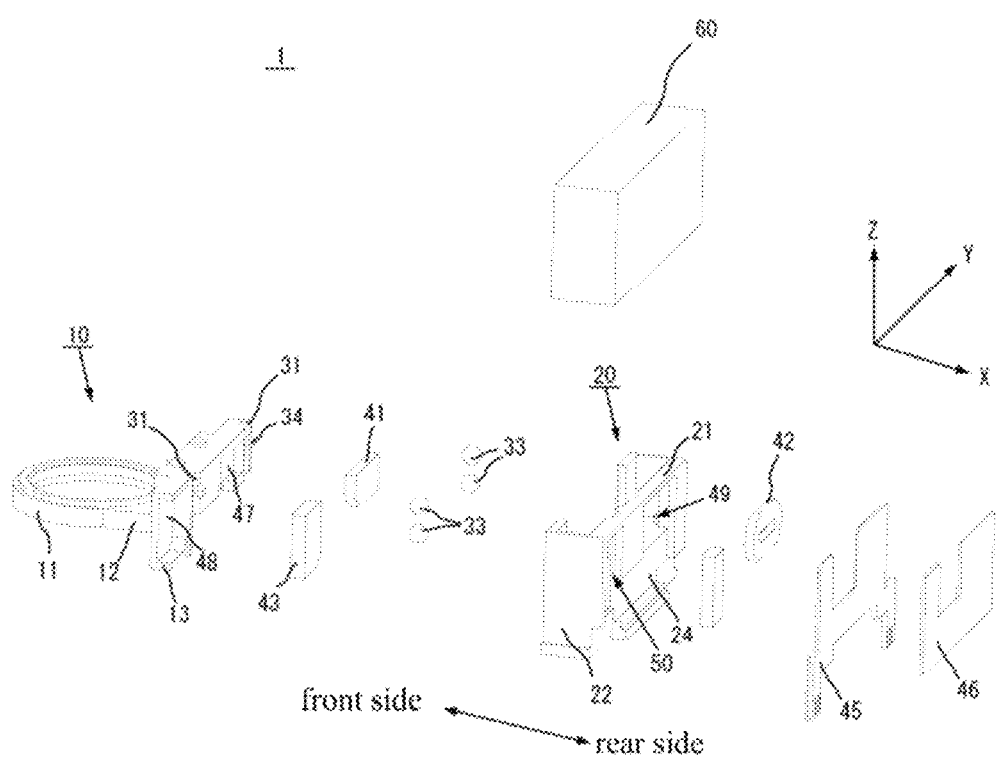
FIG. 2 is an exploded perspective view showing the configuration of a lens driving device according to an embodiment of the present disclosure as observed from the rear side.

The lens driving device 1 is used for, for example, a camera device that is mounted on an electronic apparatus such as a smartphone to implement a focus adjustment function. As shown in FIG. 1 and FIG. 2, the lens driving device 1 according to one embodiment of the present disclosure includes a lens support 10, a main body 20, a guide mechanism and a driving mechanism. Further, a position-detecting mechanism may also be included. In the present specification, mutually orthogonal X axis, Y axis, and Z axis are set. In FIG. 1, X axis is roughly in the left-right direction of the page, Y axis is roughly in the front-rear direction of the page, and Z axis is roughly in the vertical direction of the page. The X axis direction may be referred to as a first direction in some cases. The left side of the page may be specified as the front side and the right side of the page may be specified as the rear side in some cases. Further, the Y axis direction may be referred to as a second direction in some cases. Also, the Z axis direction may be referred to as the optical axial direction in some cases.

Figure 3:
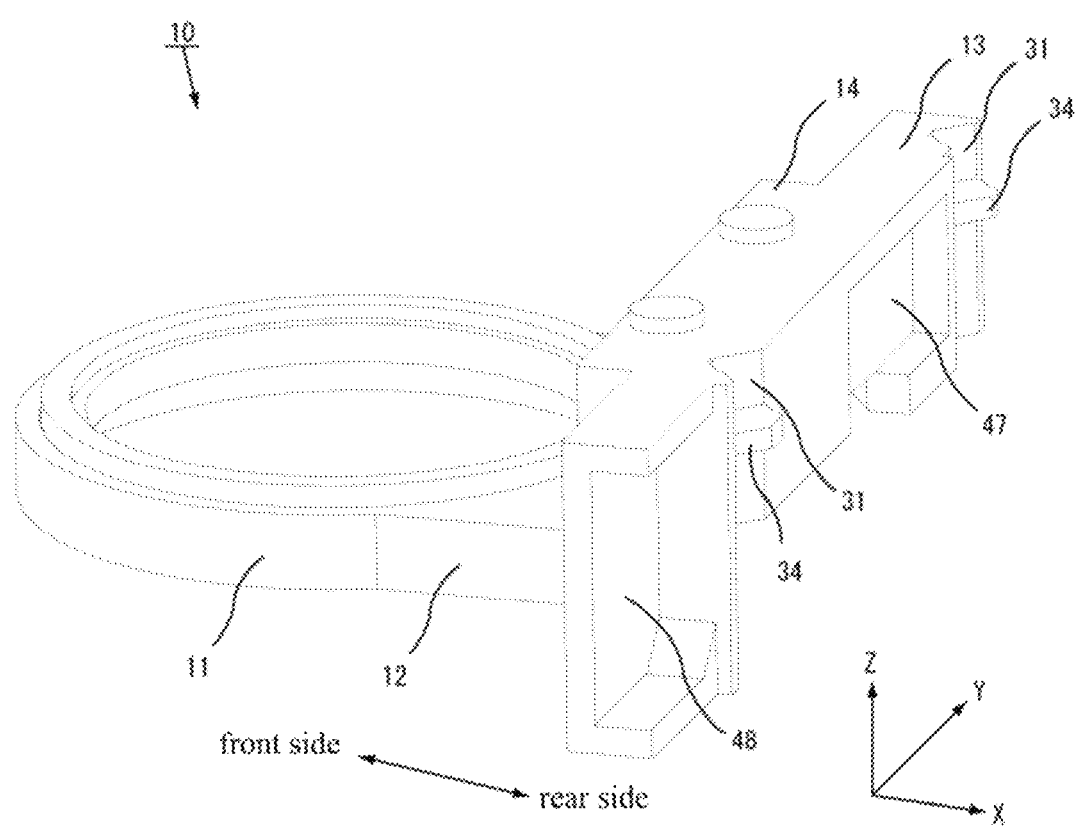
FIG. 3 is a schematic view showing the configuration of a lens support according to an embodiment of the present disclosure.

As shown in FIG. 3, the lens support 10 includes: a lens holding portion 11 formed in a substantially cylindrical shape and supporting a lens (not shown) mounted on the inner periphery thereof; a first extension portion 12 formed by extending from the lens holding portion 11 to one side (that is, the rear side of the lens holding portion 11) in the first direction (X axis direction) orthogonal to the optical axial direction (Z axis direction) of the lens; and a second extension portion 13 formed by extending from the front end of the first extension portion 12 to both sides in the second direction (Y axis direction) orthogonal to the optical axis and the first direction.

In the present embodiment, as shown in FIG. 1, the first extension portion 12 has a third extension portion 14 at the front end thereof. The third extension portion 14 is formed by extending from the front end of the first extension portion 12 in the optical axial direction, the second extension portion 13 is formed by extending from the third extension portion 14. Thereby, it is possible to freely set the position of the lens holding portion 11 in the optical axial direction. Thus, the degree of freedom in designing when combining with other lens driving devices is increased. The third extension portion 14 may not be particularly provided.

Figure 4:
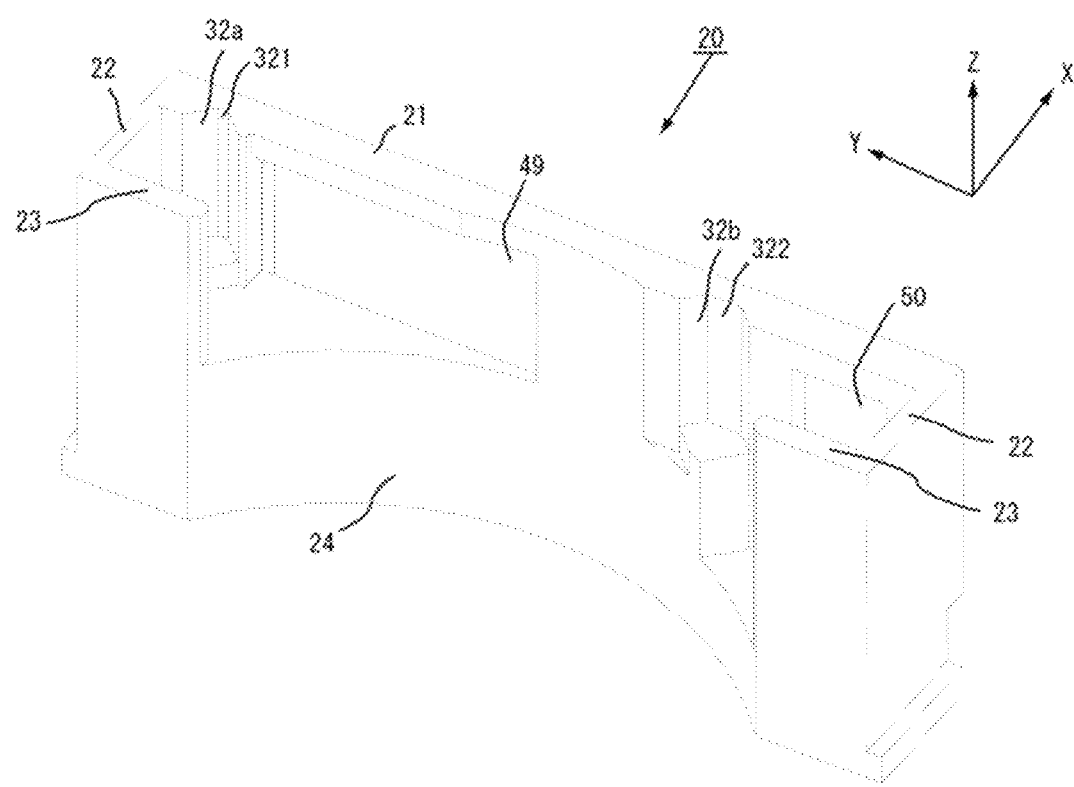
FIG. 4 is a schematic view showing a main body according to an embodiment of the present disclosure.

As shown in FIG. 4, the main body 20 includes: a first external wall 21 formed by extending along the second direction (Y axis direction); mutually opposing second external walls 22 formed by extending from both ends of the first external wall 21 along the first direction (X axis direction); and third external walls 23 formed by extending toward each other along the second direction (Y axis direction) from the ends of the two second external walls 22 opposite to the ends where the two second external walls 22 are connected to the first external wall 21. As shown in FIG. 1, FIG. 2, and FIG. 4, a base portion 24 for mounting and supporting the first external wall 21 to the third external walls 23 of the main body 20, in particular, capable of supporting the lens support 10 when assembled with the lens support 10 may be formed in the lower portion of the main body 20.

Figure 5:
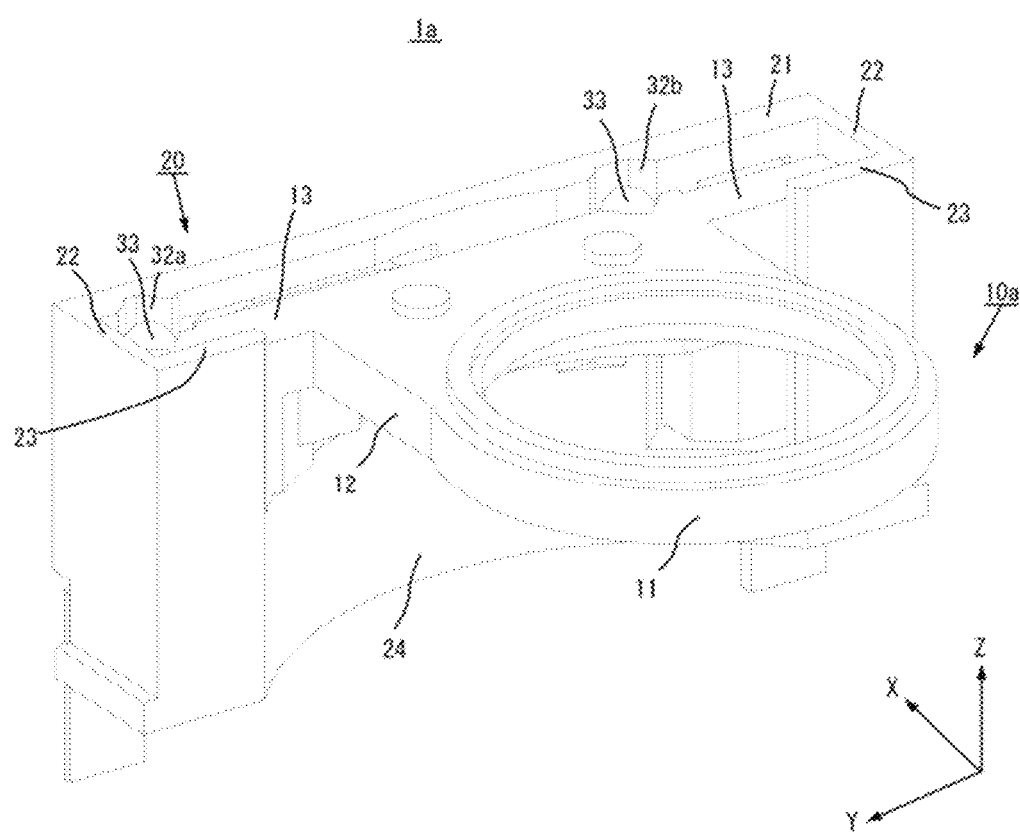
FIG. 5 is a schematic view showing a configuration in which the lens support and the main body according to an embodiment of the present disclosure are assembled.

Further, as shown in FIG. 5, a lens support 10a without the third extension portion is combined with the main body 20 such that the second extension portion 13 is provided between the first external wall 21 and third external wall 23 of the main body 20. At this time, the front end of the third external wall 23 is in a position facing the first extension portion 12. That is, the main body 20 is provided only on the +X axis direction side with respect to the center of the lens (the center of the lens holding portion 11). Further, the first extension portion 12 and the second extension portion 13 of the lens support 10a are separated from the first external wall 21 to the third external walls 23 of the main body 20 by a predetermined distance. Therefore, the lens support 10a moving forward and backward along the optical axial direction of the lens (Z axis direction) does not directly contact the main body 20, and excessive friction does not occur, so that smooth movement can be performed. In particular, the distance between the front ends of the two third external walls 23 is set to a size such that even when the lens support 10a has been moved to the full extent in the Y axis direction by, for example, any external force, the lens support 10a does not fall off from the main body 20.

After assembling as shown in FIG. 5, the rear side and the upper side of the main body 20 are covered with a cover 60 which is opened at the front side and the lower side as shown in FIG. 1 and FIG. 2 to protect each of the components. Further, the cover 60 also serves as a stopper for the lens support 10a and a ball 33 of the guide mechanism described later.

As shown in FIGS. 1 to 5, the guide mechanism is provided to the lens support 10 and the main body 20 and between the lens support 10 and the main body 20, and includes first guide portions, second guide portions, and rolling members. The second guide portions are a pair of guide grooves 31 formed on the rear side surface after combining the first extension portion 12 and the second extension portion 13 of the lens support 10. The first guide portions are accommodation grooves 32a, 32b formed on the front side surface of the first external wall 21 of the main body 20 facing the rear side surface of the lens support 10. The rolling members are balls 33 accommodated in the accommodation grooves 32a and 32b respectively, and each ball 33 is disposed in each space partitioned by a partition plate 34 provided in the guide groove 31. By providing the partition plate 34, it is possible to prevent the two balls 33 from coming into contact with each other and ensure the smooth relative movement between the lens support 10 and the main body 20. The guide grooves 31 and the accommodation grooves 32a, 32b may be V-shaped grooves having a shape of the alphabetical letter "V" or may be square grooves.

As shown in FIG. 4, as the structure of the accommodation groove, the width of the second bottom surface 322 in the second accommodation groove 32b is set to be wider than the width of the first bottom surface 321 in the first accommodation groove 32a. Thereby, even when the distance between the pair of guide grooves 31 provided on the lens support 10 is different to some extent from the distance between the accommodation grooves 32a, 32b provided on the main body 20, the lens support 10 and the main body 20 can be assembled without problems.

When assembling the lens support 10 and the main body 20, the balls 33 are accommodated between the guide grooves 31 and the accommodation grooves 32a, 32b facing to each other, and the forward and backward movement of the lens support 10 can be smoothly performed by the rolling of the balls 33. Also, as shown in FIG. 5, since the balls 33 are disposed between the lens support 10 and the main body 20, on the inner side of the main body 20, the distance from the front side surface of the first external wall 21 to the rear side surface of the third external wall 23 may be any distance as long as the second extension portion 13 of the lens support 10 and the balls accommodated between the guide grooves 31 and the accommodation grooves 32a, 32b can be arranged.

The rolling member of the guide mechanism is not limited to a ball, but may be a roller, a shaft or the like.

As shown in FIG. 1 to FIG. 4, a magnet disposition portion 47 is disposed on the rear side surface after combining the first extension portion 12 and the second extension portion 13 of the lens support 10, and a magnet 41 is disposed on the magnet disposition portion 47. Further, a coil 42 is provided in the coil arrangement window 49 of the main body 20 so as to face the magnet 41. The driving mechanism includes the magnet 41 and the coil 42, and further includes a circuit board 45 and a yoke 46 for supplying electric power to the coil 42 on the rear side of the coil 42. A driving force making the lens support 10 move forward and backward is generated by the interaction between the magnet 41, the yoke 46 and the coil 42. In addition, since the magnet 41 and the yoke 46 attract each other, it is possible to maintain a table posture of the lens support 10 with respect to the main body 20.

The lens driving device 1 further includes a position-detecting mechanism for detecting the change of the position of the lens support 10 in the optical axial direction. The position-detecting mechanism includes: a position-detecting magnet 43 disposed in a position-detecting magnet disposition portion 48 of the lens support 10; and a position-detecting element 44 disposed in a position-detecting element arrangement window 50 of the main body 20 and facing the position-detecting magnet 43. The position-detecting mechanism and the driving mechanism share the circuit board 45 and the yoke 46.

Hereinafter, with reference to FIG. 6 and FIG. 7, a composite lens driving device which is an application of the lens driving device of the present embodiment will be described.

Figure 6:
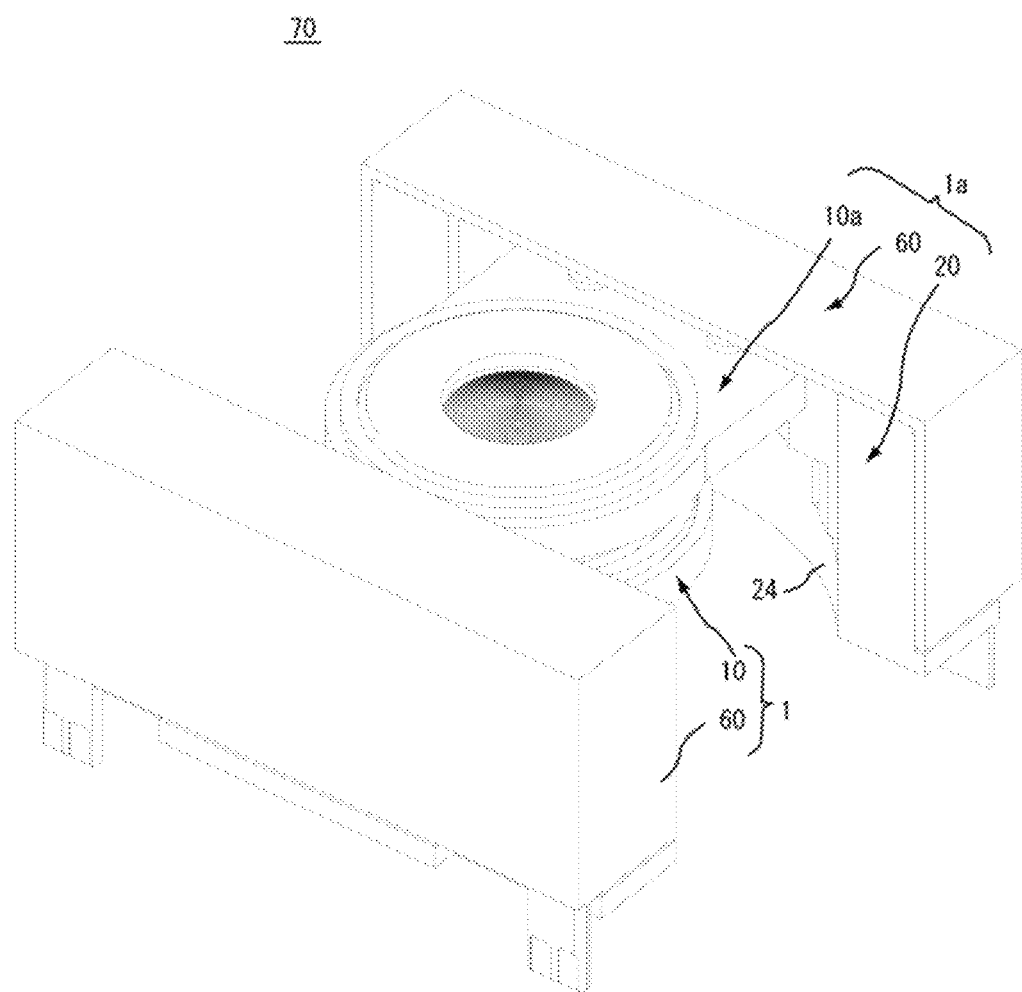
FIG. 6 is a schematic view showing a form of a composite lens driving device according to an embodiment of the present disclosure.

First, FIG. 6 shows a composite lens driving device 70 formed by combining the lens driving device 1 having the third extension portion 14 of the above embodiment and the lens driving device 1a having the lens support 10a without the third extension portion of the above embodiment. The main bodies 20, 20 of the two lens driving devices 1, 1a face to each other at the same height with the lens therebetween, so that the lens support 10a of the lens driving device 1a is positioned above and the lens support 10 of the lens driving device 1 is positioned below. It is possible to realize functions such as focus adjustment and optical zooming by using the lenses (not shown) mounted on the lens supports 10, 10a of the two lens driving devices 1, 1a in alignment with the optical axis. The size in the alignment direction of the two main bodies 20, 20 can be reduced, so that the composite lens driving device 70 can be easily miniaturized. In the embodiment shown in FIG. 6, the lens support 10a on which the third extension portion is not formed is used, but the third extension portion 14 may be used for both.

Figure 7:
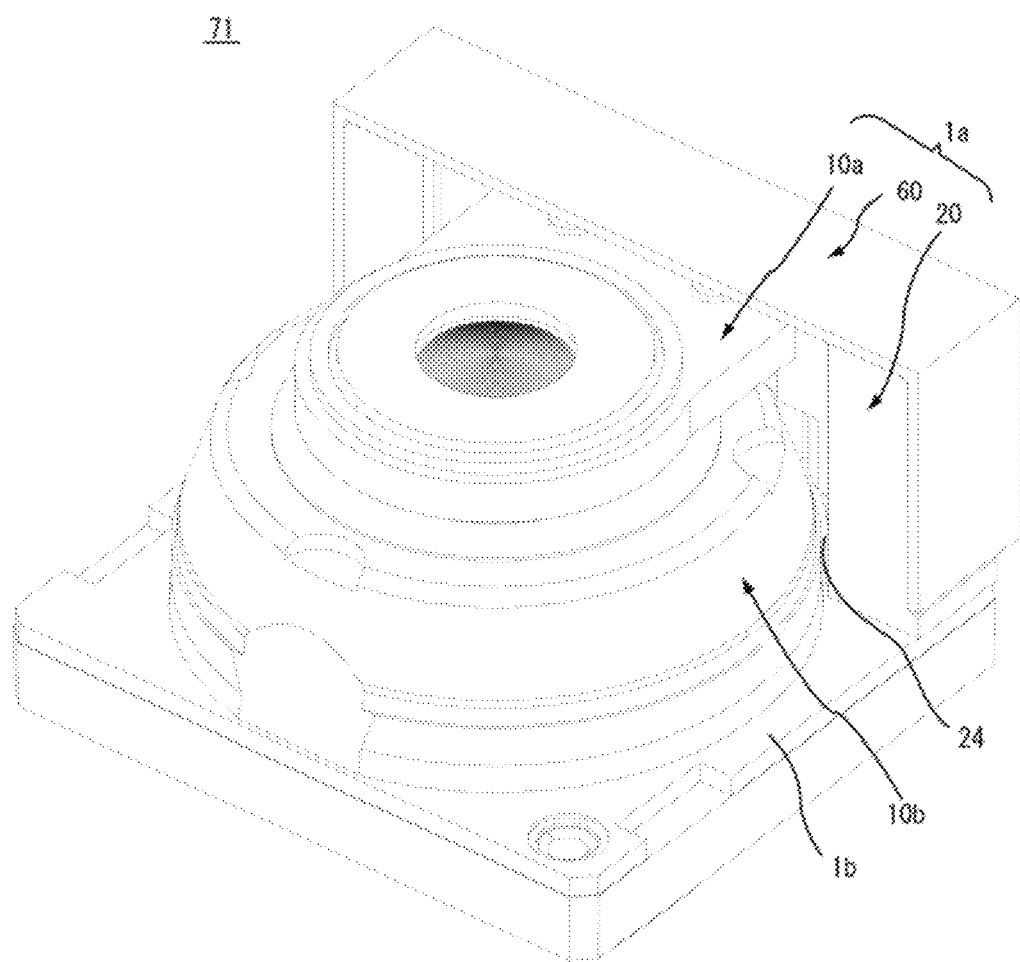
FIG. 7 is a schematic view showing another form of the composite lens driving device according to an embodiment of the present disclosure.

Further, FIG. 7 shows a composite lens driving device 71 formed by combining the lens driving device 1a of the above embodiment and another type of lens driving device 1b. The lens driving device 1b may be a structure in which the lens is fixed, or may be a structure having a focusing function, a camera shake correction function, a zooming function, and the like. The main body 20 of the lens driving device 1a is disposed on the lateral side of the lens of the lens driving device 1b, and the lens support 10a of the lens driving device 1a is disposed on the lens support 10b of the lens driving device 1b. It is possible to realize functions such as focus adjustment and optical zooming by using the lenses (not shown) mounted on the lens supports 10a, 10b of the two lens driving devices 1a, 1b in alignment with the optical axis. The composite lens driving device 71 can be configured without deviating considerably from the size of the lens driving device 1b, so that the composite lens driving device 71 can be easily miniaturized.

Here, as shown in FIG. 6 and FIG. 7, when the lens driving devices 1, 1a according to the embodiments of the present disclosure are used as composite lens driving devices 70, 71 in combination with other lens driving devices, as shown in FIG. 4 and FIG. 5, it is preferable to form the base portion 24 of the main body 20 in a concave shape so that the surface on the lens support side thereof has an arc shape. Thus, as shown in FIG. 6 and FIG. 7, the lens holding portions of other lens driving devices, which are usually formed in a cylindrical or conical shape, can be properly accommodated in the base portion 24. It is possible to miniaturize the combined configuration.

Thus, while the present disclosure has been described in detail with reference to the preferred embodiments, the purpose thereof is to enable those skilled in the art to carry out the present disclosure on the basis of understanding the contents thereof. Of course, the protection scope the present disclosure is not limited to the embodiments and examples described above, but can be modified or improved based on the spirit of the present disclosure, and all the modifications and improvements are included in the protection scope of the present disclosure.

What is claimed is:

1. A lens driving device, comprising:
 a lens support;
 a main body for supporting the lens support;
 a guide mechanism for guiding forward and backward movement of the lens support along an optical axial direction of a lens; and
 a driving mechanism for generating a driving force for driving the forward and backward movement of the lens support along the optical axial direction, wherein
 the main body, the guide mechanism, and the driving mechanism are all provided only on one side in a first direction orthogonal to the optical axis direction of the lens with respect to the center of the lens,
 the lens support comprises:
  a lens holding portion for holding the lens;
  a first extension portion extending from the lens holding portion to one side in the first direction; and
  a second extension portion extending from a front end of the first extension portion toward both sides in a second direction orthogonal to the optical axial direction and the first direction,
 the main body comprises:
  a first external wall extending along the second direction;
  opposing second external walls extending from both ends of the first external wall along the first direction; and
  third external walls extending toward each other along the second direction from ends of the opposing second external walls opposite to ends where the opposing second external walls are connected to the first external wall, and
 the lens support is combined with the main body such that the second extension portion is provided between the first external wall and the third external walls, and the front ends of the third external walls face the first extension portion.

2. The lens driving device according to claim 1, wherein the first extension portion and the second extension portion of the lens support are separated from the first external wall, the opposing second external walls and the third external walls of the main body by a predetermined distance.

3. The lens driving device according to claim 1, wherein the first extension portion further comprises a third extension portion extending in the optical axial direction at the front end thereof, and the second extension portion extends from the third extension portion.

4. The lens driving device according to claim 1, wherein the guide mechanism comprises:
 a first guide portion provided on an inner side of the first external wall which faces the third external wall;

a second guide portion provided on a rear side surface after combining the first extension portion and the second extension portion corresponding to the first guide portion; and a rolling member provided between the first guide portion and the second guide portion.

5. The lens driving device according to claim 1, wherein the driving mechanism comprises:

a magnet provided on the rear side surface after combining the first extension portion and the second extension portion of the lens support; and a coil provided on the first external wall of the main body.

6. A composite lens driving device, comprising:

the lens driving device according to claim 1 and another lens driving device, wherein optical axes of the two lens driving devices coincide with each other, and the main body is provided on a lateral side of the lens of the other lens driving device.

7. A composite lens driving device, comprising:

two lens driving devices, wherein each of the two lens driving devices comprises:

a lens support;

a main body for supporting the lens support;

a guide mechanism for guiding forward and backward movement of the lens support along an optical axial direction of a lens; and a driving mechanism for generating a driving force for driving the forward and backward movement of the lens support along the optical axial direction, wherein the main body, the guide mechanism, and the driving mechanism are all provided only on one side in a first direction orthogonal to the optical axis direction of the lens with respect to the center of the lens, optical axes of the two lens driving devices coincide with each other, the main body is provided on a lateral side of the lens of the other lens driving device, and the two main bodies are opposed to each other with the lens interposed therebetween.

8. A camera device, comprising:

the lens driving device according to claim 1.

9. An electronic apparatus comprising the camera device according to claim 8.

* * * * *